US012482957B2

(12) United States Patent
Hojjat

(10) Patent No.: US 12,482,957 B2
(45) Date of Patent: Nov. 25, 2025

(54) NARROW MIMO SIDE-BY-SIDE ARRAYS USING COMPLIMENTARY ARRAY ARRANGEMENT

(71) Applicant: Communication Components Antenna Inc., Kanata (CA)

(72) Inventor: Nasrin Hojjat, Ottawa (CA)

(73) Assignee: Communication Components Antenna Inc., Kanata (CA)

( * ) Notice: Subject to any disclaimer, the term of this patent is extended or adjusted under 35 U.S.C. 154(b) by 39 days.

(21) Appl. No.: 18/410,840

(22) Filed: Jan. 11, 2024

(65) Prior Publication Data

US 2024/0313422 A1 Sep. 19, 2024

Related U.S. Application Data

(63) Continuation-in-part of application No. 17/236,964, filed on Apr. 21, 2021, now Pat. No. 12,027,758.

(51) Int. Cl.

| | |
|---|---|
| ***H01Q 25/00*** | (2006.01) |
| ***H01Q 1/24*** | (2006.01) |
| ***H01Q 5/42*** | (2015.01) |
| ***H01Q 21/06*** | (2006.01) |

(52) U.S. Cl.

CPC ........... *H01Q 25/001* (2013.01); *H01Q 1/246* (2013.01); *H01Q 5/42* (2015.01); *H01Q 21/062* (2013.01); *H01Q 21/065* (2013.01)

(58) Field of Classification Search

CPC ............ H01Q 1/246; H01Q 5/40; H01Q 5/42; H01Q 21/06; H01Q 21/061; H01Q 21/062; H01Q 21/065; H01Q 21/28; H01Q 25/00; H01Q 25/001; H01Q 25/002

See application file for complete search history.

(56) References Cited

U.S. PATENT DOCUMENTS

| | | | |
|---|---|---|---|
| 2009/0224995 | A1 | 9/2009 | Puente |
| 2021/0111482 | A1 | 4/2021 | Raj |
| 2021/0257722 | A1 | 8/2021 | Li |

*Primary Examiner* — Robert Karacsony

(74) *Attorney, Agent, or Firm* — Sofer & Haroun, LLP

(57) ABSTRACT

A cellular antenna having at least one MIMO array has at least a first group of elements arranged in horizontal rows and vertical columns and at least a second group of elements arranged in horizontal rows and vertical columns. The first group and the second groups are arranged at least partially side-by side on said antenna. The elements of the first group are arranged in at least one vertical column of elements that is exclusive to elements of the first group. The elements of the second group are arranged in at least one vertical column of elements that is exclusive to elements of the second group. The antenna includes at least one separate common vertical column of elements, that includes elements of both said first group and the second group of elements.

18 Claims, 15 Drawing Sheets

(PRIOR ART)
10 rows 44, 44, 44, 44, 44

(PRIOR ART)
two stacked 8 rows 44, 44, 44, 44, 44

10 rows 33, 44, 33, 44, 33

Antenna 18 from Fig. 7

10 rows 33, 44, 44, 44, 44

Antenna 54 from Fig. 6

(PRIOR ART)
10 rows 44, 44, 44, 44

(PRIOR ART)
two stacked 8 rows 44, 44, 44, 44

NARROW MIMO SIDE-BY-SIDE ARRAYS USING COMPLIMENTARY ARRAY ARRANGEMENT

RELATED APPLICATION

This application is continuation of U.S. patent application Ser. No. 17/236,964 filed on Apr. 21, 2021, which in turn claims the benefit of priority from U.S. Provisional Patent Application No. 63/074,332, filed on Sep. 3, 2020, the entirety of which is incorporated by reference.

FIELD OF THE INVENTION

This invention relates to antennas. More particularly, the present invention relates to an antenna element and array arrangement for cellular antennas.

PRIOR ART

In the field of cellular antennas, FIG. 1 illustrates a prior art side by side 20 port hybrid BSA (Bi-Sector Array) with one (4×4) low band MIMO (Multiple-In Multiple-Out) arrangement and two (4×4) or one (8×8) mid band arrangement MIMOs per bisector beam.

FIG. 1 illustrates an exemplary prior art arrangement where ports 1 and 2 are feeding low band antenna elements A (ten dipoles) through a combined network of beamformer circuits and ports 3 and 4 are feeding low band antenna elements B (ten dipoles) through a variety of beamformer circuits. These elements A and B represent an exemplary a (4×4) low band arrangement. Moving to the mid band elements, ports 5 and 6 as well as ports 13 and 14 are feeding mid band antenna elements C (40 patches); ports 7 and 8 as well as ports 15 and 16 are feeding mid band elements D (40 patches); ports 9 and 10 as well as ports 17 and 18 are feeding mid band elements E (40 patches); and ports 11 and 12 as well as ports 19 and 20 are feeding mid band elements F (40 patches). These elements C-F represent the two (8×8) mid band MIMO arrangements.

To this end, the architecture of FIG. 1 illustrates for the four mid band arrangements, 4 bi-sector independent antenna arrays of forty patch elements each, as shown by elements C-F and in total have eight vertical columns of mid-band elements. The low band arrangements on the same antenna are in two staggered vertical columns of low-band dipoles A and B. This architecture is based for example on U.S. Patent Publication No. 2018/0301801A1, incorporated by reference, with the low-band elements A and B being dipoles antennas and mid-band elements C-F being patch antennas. The total width of a panel incorporating such an antenna is >600 mm, due to the eight column architecture of the mid band elements of the antenna.

However, considering the new trend for 4G/5G communication, there is an ever increasing need to place many base station antennas adjacent each other in towers utilizing smaller antenna dimensions, particularly with narrower widths. One option for decreasing the width of the antenna is to eliminate one column and employ only three columns of mid band arrays instead of four, but this approach considerably reduces the performance of the antenna for azimuth sidelobe and gain characteristics.

Another version of a similar prior art architecture uses a mix of three and four columns of low band dipole elements as shown in FIG. 2 (taken from U.S. Patent Application No. 2018/0301801 and described in the related sections on paragraphs [0052-0053] and incorporated herein by reference.). However, the mid band patch elements still occupy eight physical columns across the width and thus the antenna width is greater than 600 mm as with the prior art arrangement of FIG. 1.

SUMMARY OF INVENTION

The present arrangement looks to decrease the width of the antenna by making it significantly less than 600 mm wide without compromising azimuth sidelobe and gain performance. In one embodiment, in the present arrangement, to narrow the width of the antenna without noticeably compromising the performance, a new architecture is provided with entangled arrays. In this architecture alternate rows (or a pair of rows) of mid-band array have a different number of columns. The number of columns for left and right arrays are assigned in a complementary format so in total the width of array would be seven vertical columns instead of eight columns. The following is a brief summary of the interweaved array architecture. Further details and explanations, including the array numbers can be found in the subsequent Drawings and Detailed Description sections of this application.

In one embodiment, an antenna architecture is provided for a twenty port hybrid BSA (Bi-Sector-Array) with one (4×4) low band MIMO and one (8×8) or two (4×4) mid band MIMOs per bisector beam. The mid-band is 33 deg Azimuth beamwidth at 1695-2690 MHz and the low band is 65 deg Azimuth beamwidth at 698-960 MHz. The mid band arrays are arranged with at least two side by side arrays in which the two arrays at both the top and bottom of the antenna are entangled together in a complementary format in terms of number of columns. This reduces the number of vertical columns in side by side architecture by one column which reduce the width of antenna compared to prior art. For example, the width of this antenna may be about 500 mm wide instead of more than 600 mm as in the prior art of FIGS. 1 and 2.

In this arrangement, the antenna architecture is two stacks of side-by-side bisector arrays of mid band elements, and two columns of low band elements to make a twenty port antenna array. The antenna architecture is two side by side bisector arrays with the arrangement of patches being 3,3, 4,4, 3,3 . . . for the top left side array and 4,4, 3,3, 4,4 . . . for the top right side array. This is explained in more detail below for example with FIG. 3A, but for brevity, this means that for the array starting at the top left of the antenna, horizontal rows one and two of the elements have three patch elements (the top of vertical columns one through three) and the array on the top right has four patch elements in horizontal rows one and two (the top of vertical columns four through seven). For horizontal rows three and four the pattern reverses, and the top left array has four patch elements and the top right array has three patch elements, the pattern continuing down the vertical length of the antenna.

An exemplary embodiment of the invention using this pattern can be an antenna with an eight-row array, on the top left of the antenna 3,3, 4,4, 3,3, 4,4, and for the top right array, 4,4, 3,3, 4,4, 3,3 but spanning only seven vertical columns total instead of eight. The numbering of columns is explained in more detail below in the detailed description. See for example the description of FIG. 3A.

In another embodiment, using the same concept for the pattern designation, the antenna architecture is a two side by side array with bisector arrays, with the number of columns being 3,4, 3,4, 3,4 . . . and 4,3, 4,3, 4,3 . . . . An exemplary antenna as such can be an eight-row array, on the top right with antenna element placement pattern of 3,4, 3,4, 3,4, 3,4, and for the top left array having an antenna element placement pattern of 4,3, 4,3, 4,3, 4,3, again with seven vertical columns total as shown for example in FIG. 3B and described in more detail below.

It is understood that similar architecture patterns can be use in other sized antennas that have two side by side arrays. For example, in another embodiment, the antenna architecture—with a total of 5 vertical columns can be implemented for a 33 deg antenna which would usually be 6 columns wide with the number of columns (in the five column arrangement) being 2,2, 3,3, 2,2 . . . and 3,3, 2,2, 3,3 . . . . An exemplary antenna as such can be a ten row array on the left of the antenna with antenna element placement pattern of 2,2, 3,3, 2,2, 3,3, 2,2 and for the right array having antenna element placement pattern of 3,3, 2,2, 3,3, 2,2, 3,3 with five total vertical columns. This reduces the width of the array from about 300 mm to about 240 mm for an array implemented in high-band frequencies 3100-4200 MHz.

In another embodiment, an antenna architecture with two bisector arrays is partially side by side and, only in the common area, with the number of columns being reduced by one, using a complementary number of columns. The antenna architecture can have two partially side by side arrays that have columns of 4,4, 4,4, 4,4, 4,4, 3,3 and 3,3, 4,4, 4,4, 4,4, 4,4 in a twelve port array architecture also described in more detail below. In this implementation, the antenna width was reduced from 570 mm to 496 mm, and also the high band gain increased by about 0.8 dB due to different architecture and addition of two entangled rows.

BRIEF DESCRIPTION OF THE DRAWINGS

The present invention can be best understood through the following description and accompanying drawing, wherein:

FIG. 6 and7) compared to the prior art.

DETAILED DESCRIPTION

Figure 3A:
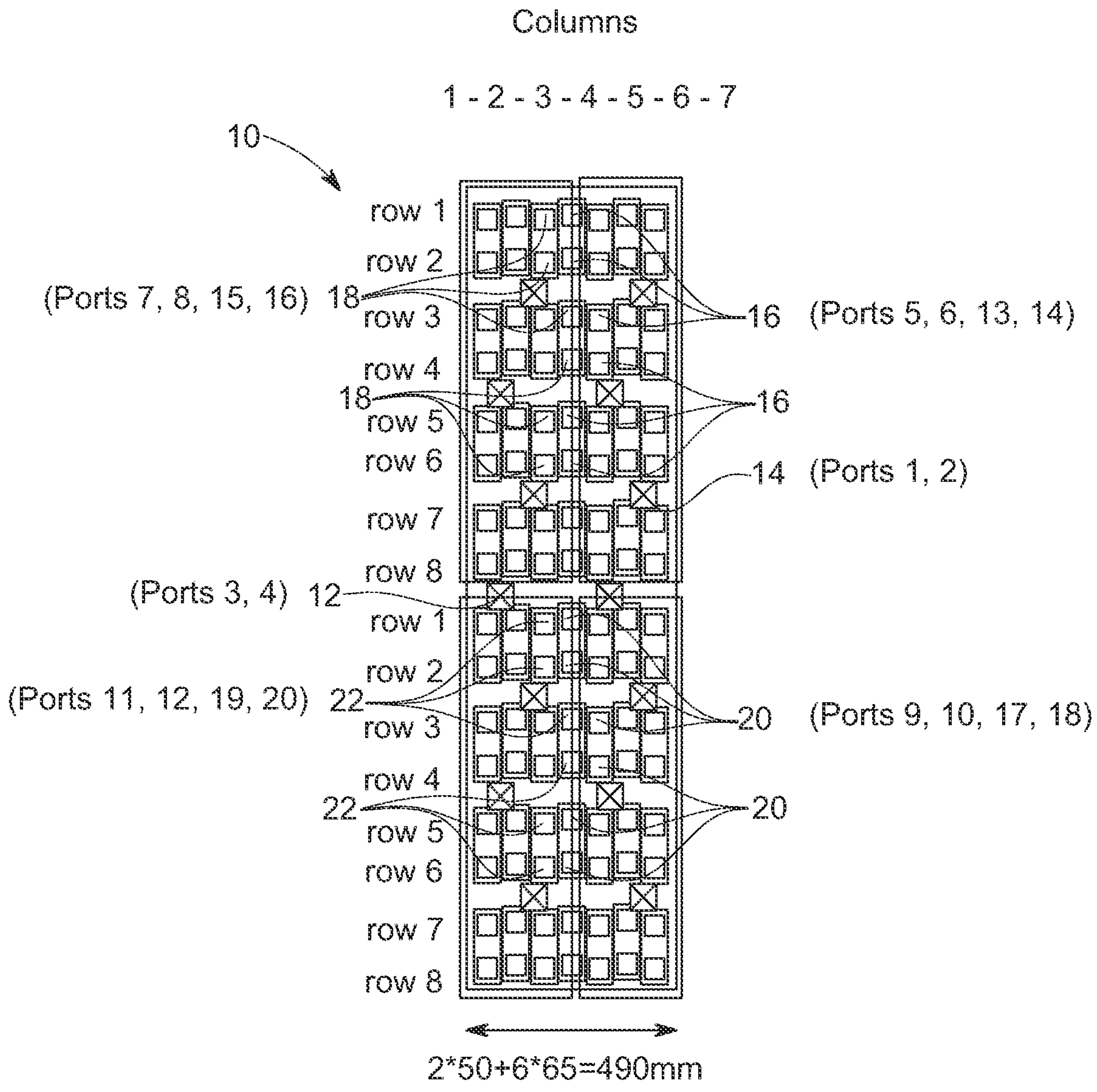
FIGS. 3A and 3B illustrate two different antenna architectures for a side by side bisector arrays with entangled interconnected mid band arrays with seven columns and a common center point line, in accordance with one embodiment.

In one embodiment of the present invention as shown in FIG. 3A a 20 ports hybrid BSA (Bi-Sector Array) 10 is shown with one 4×4 MIMO arrangement and two (4×4) or one 8×8 MIMO arrangements, per bisector beam the mid band operating at 1695-2690 MHz (two 8×8 MIMOs) and the low band being at 65 deg and operating at 698-960 MHz (one 4×4 MIMO).

In this example, a first vertical column 12 of low band dipole elements is arranged on one side of antenna 10 and another second vertical column 14 of low band dipole elements is arranged on the other side of antenna 10. Low band elements 12 can be connected to ports one and two of the twenty ports and low band elements 14 can be connected to ports three and four of the twenty ports forming the 4×4 MIMO at the low-band (698-960 MHz).

On antenna 10 there are four arrays of mid-band elements totaling twenty eight elements in each array. A first set of mid band elements 16 can be connected to ports five, six, thirteen and fourteen of the twenty ports. A second set of mid band elements 18 can be connected to ports seven, eight, fifteen and sixteen of the twenty ports. A third set of mid band elements 20 can be connected to ports nine, ten, seventeen and eighteen of the twenty ports. A fourth set of mid band elements 22 can be connected to ports eleven, twelve, and nineteen and twenty of the twenty ports. Together this set of elements 16, 18, 20 and 22 form the two 8×8 MIMO (Multiple-Input Multiple-Output) for the mid-band (1695-2690 MHz) the first 8×8 MIMO is on the left beam and the second 8×8 MIMO is on the right beam. Each set of twenty-eight elements (16, 18, 20, and 22) produce both a right and left beam.

As shown in FIG. 3A, the four sets of mid band elements 16, 18, 20, and 22 are arranged with elements 16 and 18 in two side by side arrays at the top of antenna 10 and elements 20 and 22 are arranged side by side at the bottom of antenna 10. At the top of antenna 10 the array of elements 16 and 18 are arranged in eight horizontal rows (top rows one through eight) and at the bottom of the antenna elements 20 and 22 are arranged in eight additional horizontal rows (bottom rows one through eight).

For both the top arrays of elements 16 and 18 and the bottom arrays of elements 20 and 22, there are only seven total vertical columns (columns one through seven).

Across the top row of antenna 10, there are three elements 18 and four elements 16. The same is true of row two. For rows three and four it is reversed and there are four elements 18 and three elements 16. In each case there are seven total elements across each row one in each of columns one through seven. The pattern repeats again for rows five through eight at the top half of antenna 10 for the arrays of elements 16 and 18.

This means that looking at the arrays of elements 18 and 16 at the top half of antenna 10 on a column basis, elements 18 form three columns (e.g. columns one, two, and three) in rows one and two, four columns (e.g. columns one, two, three, and four) in rows three and four, three columns in rows five and six, and four columns in rows seven and eight. Thus, the mid band MIMO array of elements 18 can be annotated with a 3,3, 4,4, 3,3, 4,4 pattern designating the number of elements 18 in each of rows one through eight on the top left of antenna 10. The mid band MIMO array of elements 16 can related be annotated 4,4, 3,3, 4,4, 3,3 pattern designating the number of elements 18 in each of rows one through eight on the top left of antenna 10. As shown in FIG. 3A, this pattern is again repeated for the arrays of elements 22, and 20 respectively at the bottom half of antenna 10. Based on this arrangement elements 18 are the only elements in columns one, two, and three and elements 16 are the only elements in columns five, six, and seven.

However, as can be seen in FIG. 3A the centerline column four has elements 16 and 18 from both arrays. For example, in rows one and two, column four has elements 16 from the top right array, but in rows three and four, column four has elements 18 from the top left array. This pattern repeats down the center column four. This is where the top left and top right arrays "interlock" with one another as shown in FIG. 3A.

Figure 3B:
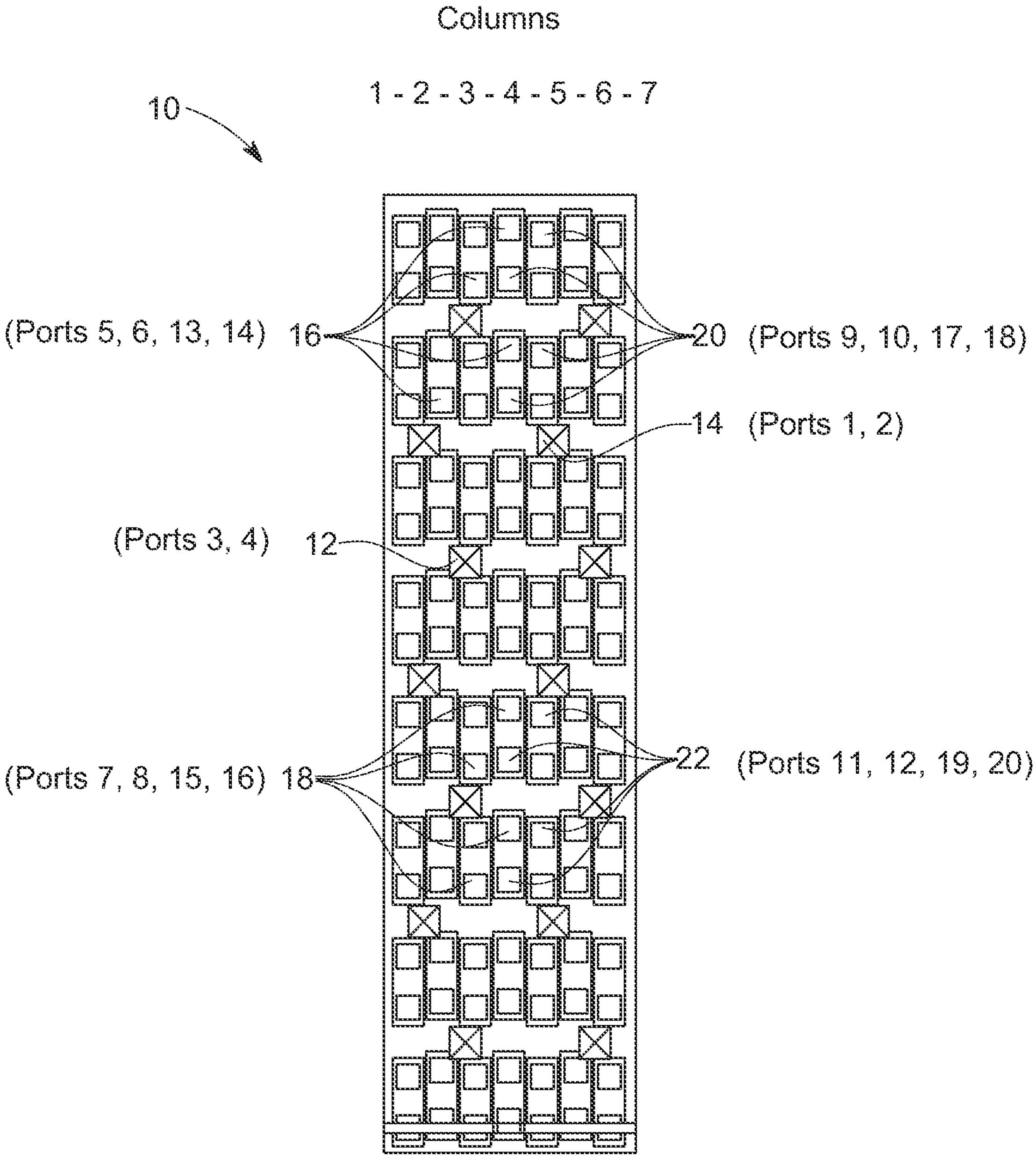

In another related embodiment, shown in FIG. 3B, across the first row of antenna 10, there are four elements 16 and three elements 20. The reverse is true of row two which has three elements 16 and four elements 20. In each case seven total elements across each row forming the top of columns one through seven. The pattern repeats again for rows three through eight at the top of antenna 10 for the arrays of elements 16 and 20. The same pattern holds for array elements 18 and elements 22 at the bottom of antenna 10.

Essentially, FIG. 3B is similar to FIG. 3A except that in the center column four, moving vertically down antenna 10 has one element 16 then one element 20, with the pattern continuing. This means instead of alternating every two rows, column four alternates every other row. This means that looking at the arrays of elements 16 and 20 at the top half of antenna 10 on a column basis, there are four elements 16 in row one and three elements 20, starting the top half of the seven vertical columns. This is reversed in row two with only three elements 16 and four elements 20 forming the next row of the seven columns. The pattern is repeated for rows three through eight at the top of antenna 10. Thus, the mid band MIMO array of elements 16 can be annotated as 4,3, 4,3, 4,3, 4,3 pattern. The mid band MIMO array of elements 20 can be annotated as 3,4, 3,4, 3,4, 3,4. Pattern. As shown in FIG. 3B, this pattern is again repeated for the arrays of elements 18, and 22 respectively at the bottom of antenna 10.

As seen in FIG. 3B the centerline column four has elements from elements 16 and elements 20. For example, in row one, column four has elements 16 from the top left array, but in row two, column four has elements 20 from the top right array. This pattern repeats down the center column four. This is where the top left and top right arrays "interlock" with one another as shown in FIG. 3B. Compared to architecture in FIG. 3A, architecture in FIG. 3B may be used to provide an improved elevation pattern but has slightly more complex feed structure for the middle column that can be addressed using two element subarrays, feeding each element independently. The improved elevation pattern in the embodiment of FIG. 3B compared to FIG. 3A is due to less vertical space between the elements in column four for each of the left and right arrays. For example, as can be seen in FIG. 3A the maximum vertical spacing is three rows between any two elements 16, while in FIG. 3B the maximum vertical spacing is two rows between any two elements 16 (the same is two for any of elements 16, 18, 20, and 22 in column 4).

The element arrangements in FIG. 3B of 16, 18, 20 and 22 can be assigned different port assignments in this embodiment, but it is noted that any effective port assignment that generates an 8×8MIMO antenna may be used. It is noted that port assignment is based on the desired beams so the customer may implement such embodiment as two 4*4 MIMOs as an alternative port implementation.

Figure 1:
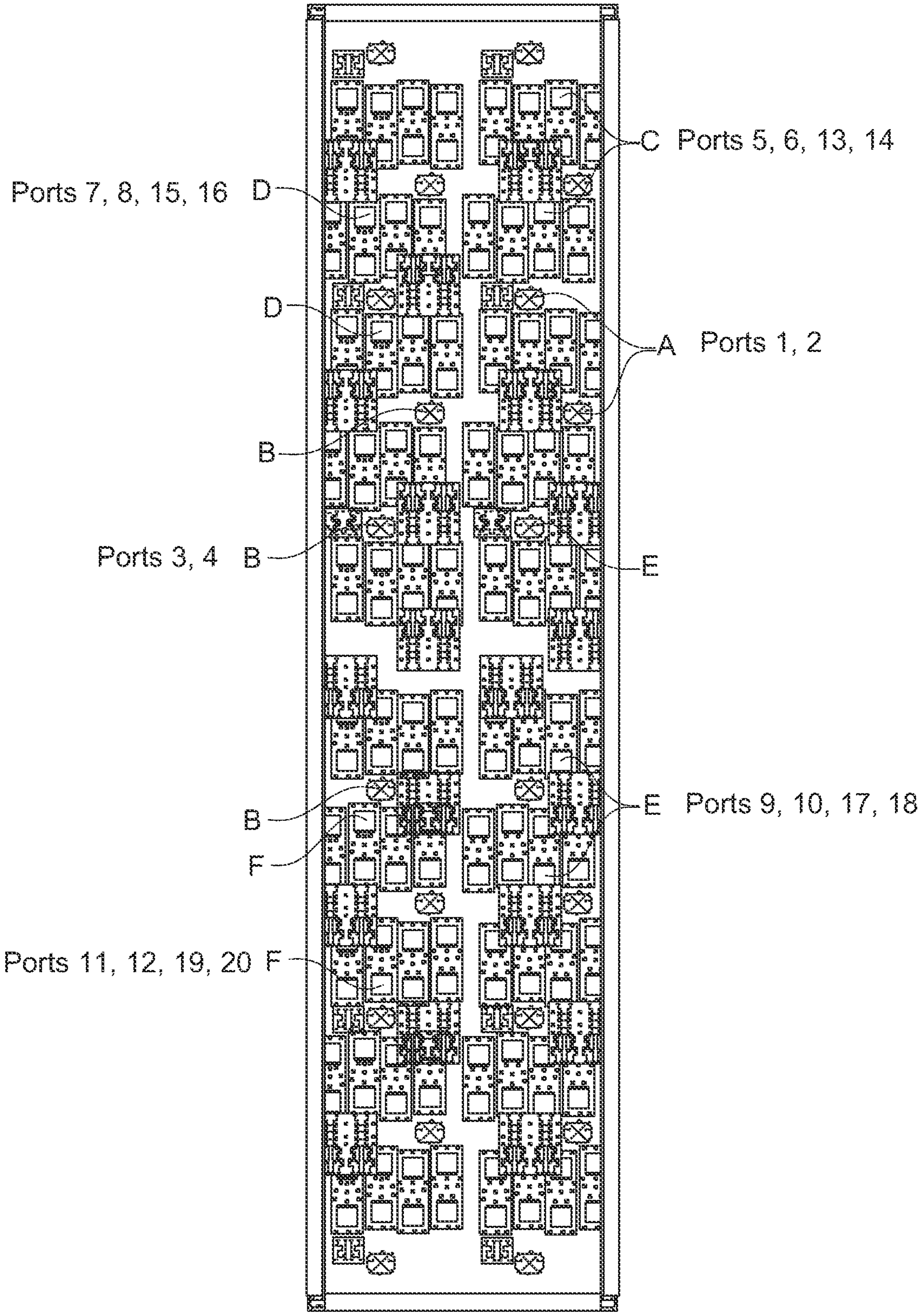
FIG. 1 PRIOR ART
FIG. 1 illustrates a prior art antenna architecture for a side-by-side midband bisector array with eight columns of midband elements and two columns of lowband 65 deg array.
Figure 2:
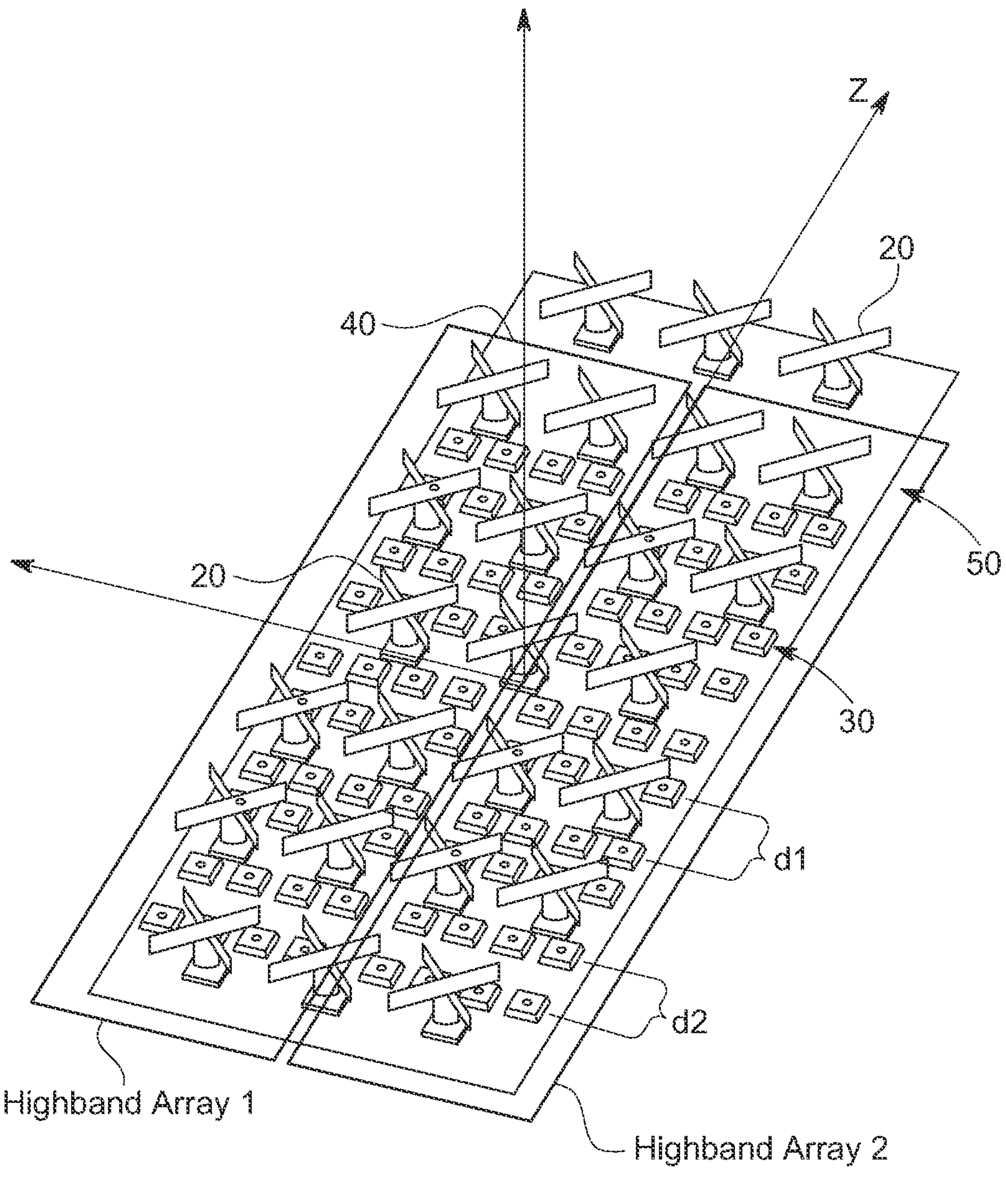
FIG. 2 PRIOR ART
FIG. 2 illustrates another prior antenna architecture for a side-by-side midband bisector array with eight columns of misband elements and a bisector lowband array.

As explained above, the embodiments shown in both FIGS. 3A and 3B are narrower than the prior art implementation of FIG. 1 which does not have a central interleaved column. As a specific example, the prior art antenna shown in FIG. 1 is 662 mm width and the embodiments shown in FIGS. 3A and 3B are only 496 mm wide-netting a 166 mm reduction in width. The interleaved central column that shares elements from both the left and right side arrays accounts for a majority of the width reduction. Also such architecture allows for other improved structuring to even further reduce width including, such as removal of azimuth staggering, reducing the general spacing of side by side arrays and some mechanical margins. For example, in the examples of FIGS. 3A and 3B the width reduction of 166 mm can be accounted to be 70 mm from the reduction of one column, 30 mm reduction of spacing between adjacent arrays, 35 mm by omitting staggering, and 31 mm other allowable mechanical changes. In any case, the central center column including elements from both side by side arrays and the reduction in total columns by one greatly improves the width footprint over the prior art.

To summarize the architecture of antenna 10 with four-eight row arrays of elements 16, 18, 20 and 22 as shown in FIGS. 3A and 3B, have total seven columns in width with FIG. 3A showing an array of 3,3, 4,4, 3,3, 4,4 pattern (elements 18 and 22) entangled with an array of 4,4, 3,3, 4,4, 3,3 pattern, (elements 16 and 20), and FIG. 3B showing an array of 4,3, 4,3, 4,3 4,3 pattern (elements 16 and 18) entangled with 3 an array of, 4, 3,4, 3,4, 3,4 pattern (elements 18 and 22). The above descried arrangement is intended to be exemplary. Such features may be equally applied to other antenna arrangements with different numbers of columns, rows, and for different frequency bands.

For example, both antennas 10 shown in FIGS. 3A and 3B may include arrays that have 10 rows of elements instead of eight rows per array This would simply be a larger version of that shown in FIGS. 3A and 3B with more total elements per array. FIGS. 3A and 3B each have twenty eight elements each of elements 16, 18, 20, and 22. But the alternative arrangement with ten rows per array would have either thirty-four/thirty-six elements 16, 18, 20, and 22 per array (when alternating every two elements in the center column) or thirty five elements 16, 18, 20, and 22 per array (when alternating every other element in the center column), all with the same repeating interlocking pattern repeating down the vertical length of antenna 10.

It is noted that in FIGS. 3A and 3B antenna elements 16, 18, 20, and 22 are illustrated as patch elements, but it is understood that the invention is not limited in this respect. For example, similar architecture and interlocking of array/array elements may be achieved with dipole elements or any other type of radiating elements that could be used on an antenna and benefit from the reduced width provided, as shown for example in the following examples in FIGS. 4 and 5.

Figure 4:
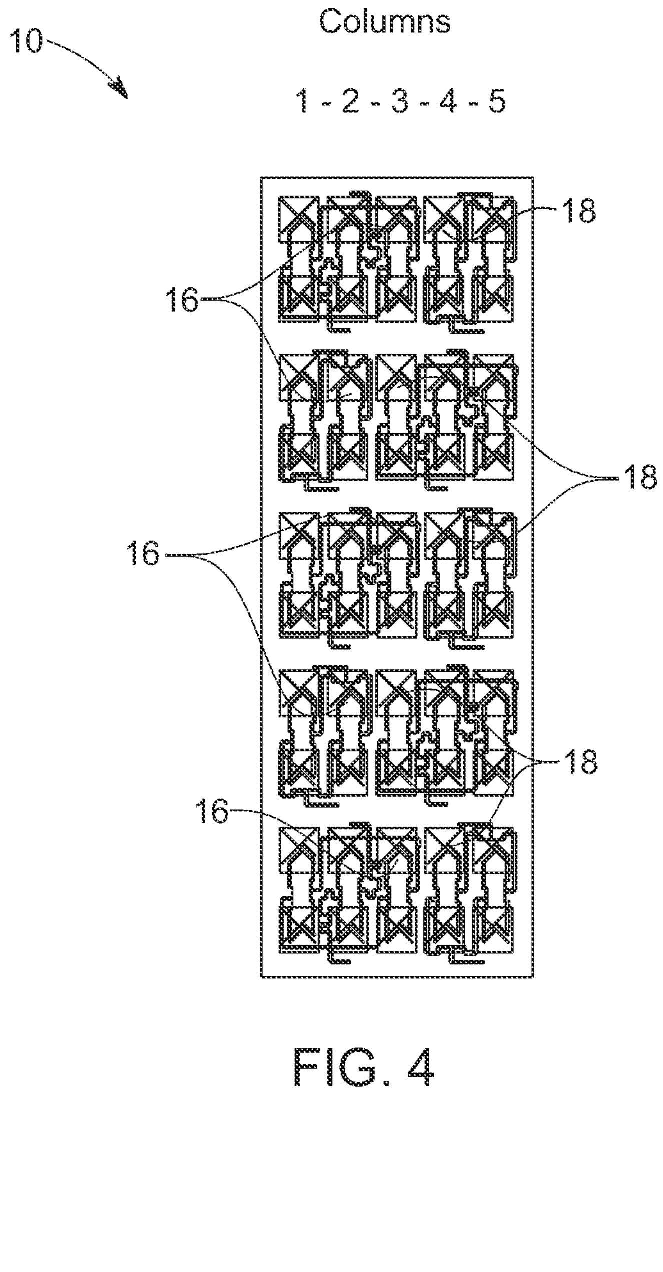
FIG. 4 illustrates an exemplary antenna architectures for two side by side 33 deg broadside arrays with entangled interweaved mid band arrays with five columns and a common center point line, in accordance with another embodiment.

Also in another embodiment shown in FIG. 4, a broadside 33 deg antenna 10 with five total vertical columns (instead of prior art six columns) can be arranged where for example each array of elements 16, arranged in ten rows, can have an array on a left side with a 3,3, 2,2, 3,3, 2,2, 3,3 pattern (e.g. rows one and two have three elements, rows three and four have two elements, etc. . . . ) and the interlocking array of elements 18 on the right side of antenna 10 would be 2,2, 3,3, 2,2, 3,3, 2,2 pattern (e.g. rows one and two have two elements, rows three and four have three elements, etc. . . . ). In this arrangement elements from the left side array would fill all of vertical columns one and two and elements from the right side array would fill all of vertical columns four and five with a central column three having elements from both the left and right array alternating each array every two rows. As with the width reduction in embodiments of FIGS. 3A and 3B relative to prior art FIG. 1, this embodiment also results in a reduction of about 60 mm (240 mm down from the prior art 300 mm width).

Figure 5:
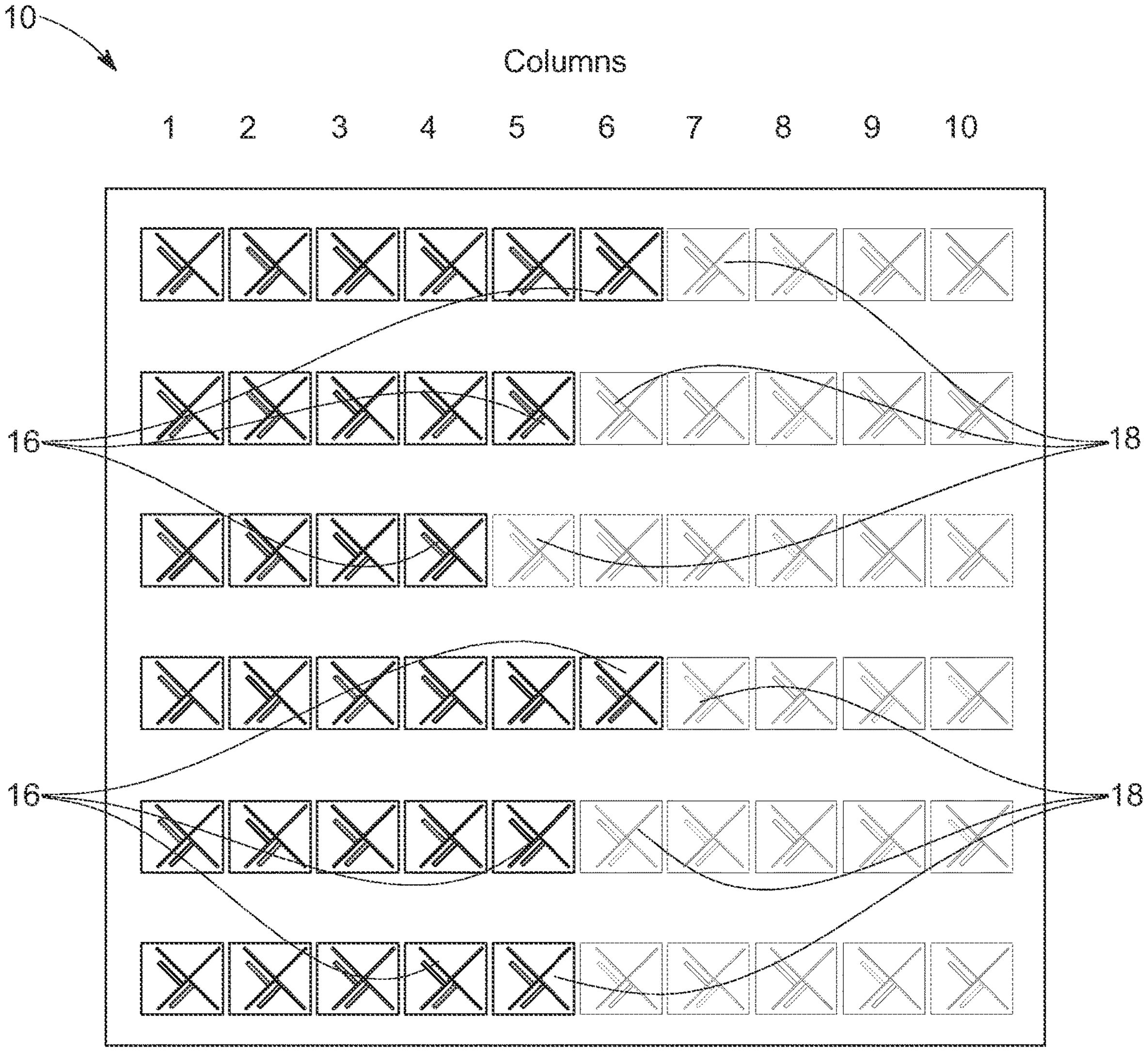
FIG. 5 illustrates an exemplary antenna architecture for a side-by-side multibeam arrays with entangled interweaved mid band arrays with ten columns and a common center point line, in accordance with another embodiment.

In yet another embodiment shown in FIG. 5 such an interweaved design can include further reducing number of columns by more than one, such as from twelve columns to ten, by using the same entangling concept used. For example, an antenna with two side by side arrays each having six rows, rows one through six, can be arranged in ten vertical columns one through ten (instead of prior art twelve columns). As with the width reduction in embodiments of FIGS. 3A and 3B relative to prior art FIG. 1, this embodiment also results in a reduction of about 100 mm (460 mm down from the prior art 560 mm width).

This arrangement of elements 16 could be a 6, 5, 4, 6, 5, 4 pattern for the left side array which is interleaved with a right side array of elements with a 18 with 4, 5, 6, 4, 5, 6 pattern. This would mean that row one of the antenna would have six elements 16 from the left side array and four elements 18 from the right side array. Row two would have five elements 16 and 18 from both the left and right side arrays. Row three would have four elements 16 from the left side array and six elements 18 from the right side array. The pattern would repeat for rows four, five and six. This would mean that vertical columns one, two, three, and four would only have elements from the left side array and columns seven, eight, nine, and ten would only have elements form the right side array, with columns five and six having elements from both arrays depending on the row.

Figure 6:
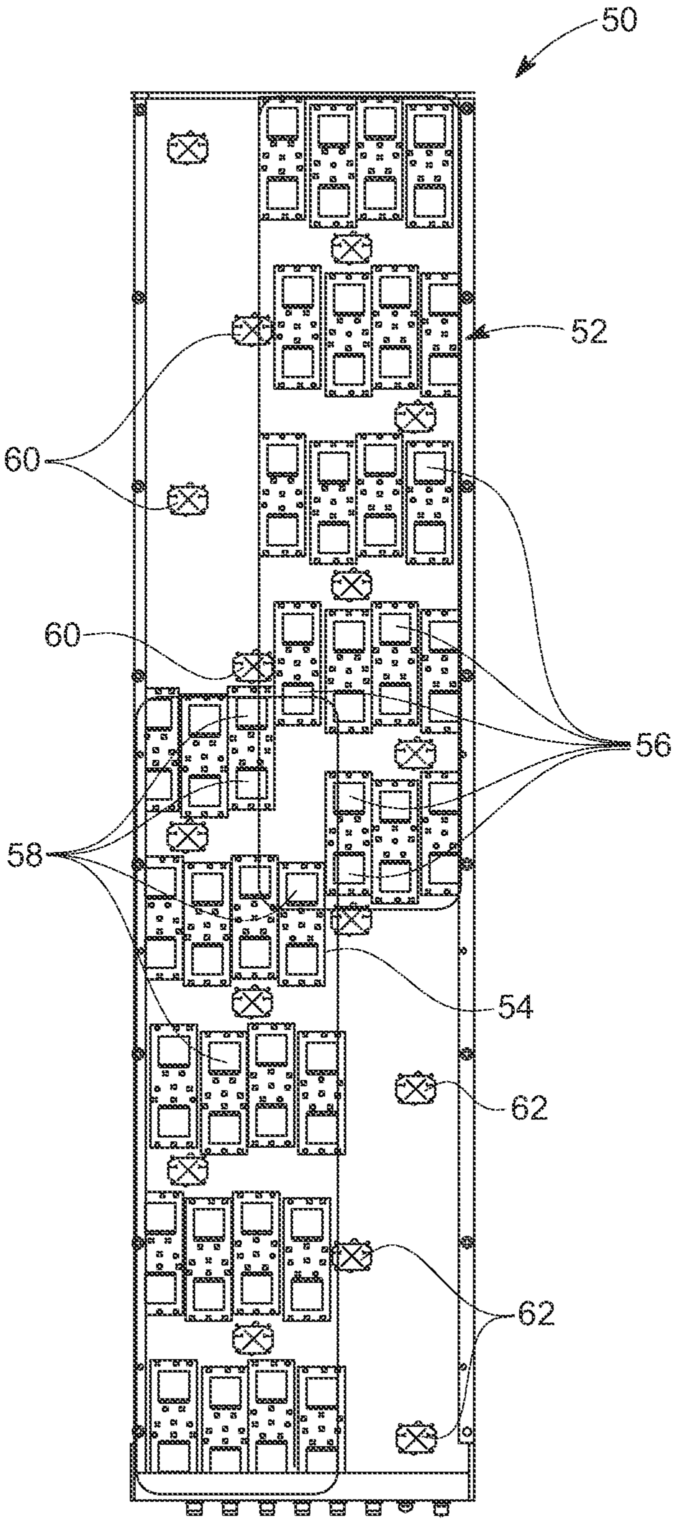
FIG. 6 illustrates a partial interweaved structure of arrays, in accordance with another embodiment.

In another embodiment as shown in FIG. 6, two 4×4 MIMO array 50 is illustrated with two over lapping mid band groups 52 and 54. This array provides a 4×4 MIMO per beam. As shown in the figure, top group 52 is offset to the right side of array 50 with bottom group 54 offset to the left. Top group 52 is made from a series of patch elements 56 arranged as a 4, 4, 4, 4, 3, pattern and bottom group 54 is made from a series of patch elements 58 arranged as a 3, 4, 4, 4, 4 pattern. Such an embodiment can also support two staggered vertical columns of dipoles 60 and 62 to form a low band 4×4 MIMO. This reduces the width from 560 mm in prior art to 496 mm.

Starting from the top of array 50, in the arrangement shown in FIG. 6 there are seventeen horizontal rows with elements 56 of top group 50 occupying only top rows one through ten, and elements 58 of bottom group 54 occupying bottom rows eight through seventeen. Thus, across row one vertical columns one through three are empty (aside from the separate low band elements 60 and 62), and columns four through seven have an element 56. The same is true of rows two through seven. In rows eight through ten, elements 56 only occupy columns five through seven with elements 58 occupying columns one through three. There are no elements 56 or 58 in column four in row nine. Regarding the bottom group 54, elements 58 in rows eight and nine occupy columns one through three. In rows ten through seventeen elements 58 occupy rows one through four.

As with FIGS. 3A and 3B the center column four is shared by both top and bottom groups 52 and 54 with elements 56 in column four, rows one through eight, and with elements 58 occupying column four, rows ten through seventeen (row nine column four is empty.) Such antenna 50 can have a twelve ports array with narrow width while the gain of each array is increased by having ten rows instead of eight rows. Ports five through twelve supply groups 52 and 54 to form the mid band 8×8 MIMO and ports one through four supply two staggered vertical columns of dipoles 60 and 62 to form a low band 4×4 MIMO.

Figure 8A:
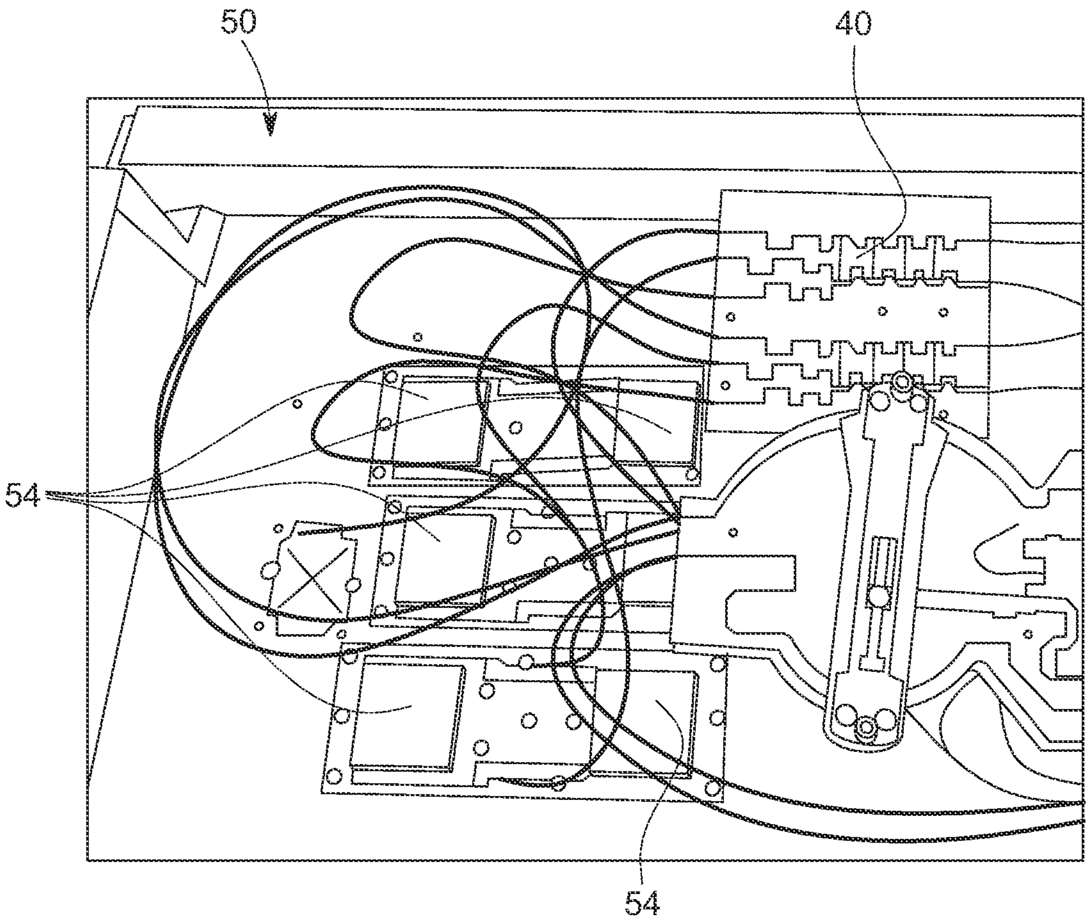
FIGS. 8A and 8B illustrate a partial array from FIG. 3A and a ABFN (Azimuth Beamforming Network) in accordance with one embodiment.
Figure 8B:
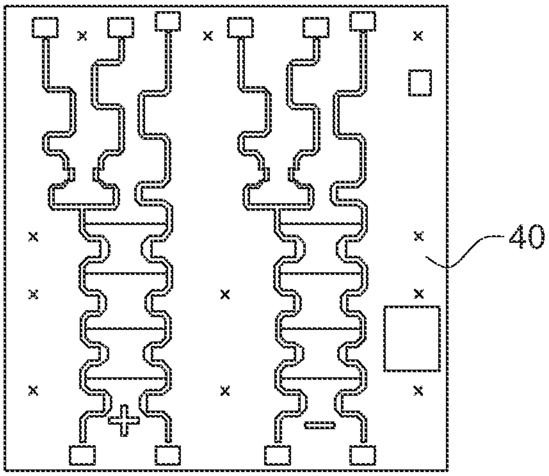

In one embodiment it is noted that an exemplary new azimuth beamformer for the three/four column antenna arrangement was designed for use for example in supplying signals to such test arrays from antenna array 10 and 50. FIG. 8A for example illustrates a partial picture of a 33, 44, 44, 44, 44 antenna 50, similar to top group of elements 54 of FIG. 6. A three column beamformer 40 is shown in schematic in FIG. 8B and placed next to elements 54 in FIG. 8A.

Beamformer 40 may be implemented as a three output BFN (Beam Forming Network) that produces two bisector beams by introducing 90 deg/−90 deg phase difference between columns and excitation amplitude of 0.7, 1, 0.7. The input ports of beamformer 40 may be assigned in a way that produce absolute phase matches with four columns beamformer used in the rows with four columns. For example, to have the correct phasing for the desired elevation pattern, phase center of rows with three column and rows with four column should match. This phase center depends if the omitted columns is the farthest right or farthest left column.

In order to confirm the pattern effectiveness as well as azimuth sidelobe and gain performance at least two prototypes proving the above concept were built and tested with an array similar to the left array of this design to see the effect on pattern and directivity.

Figure 7:
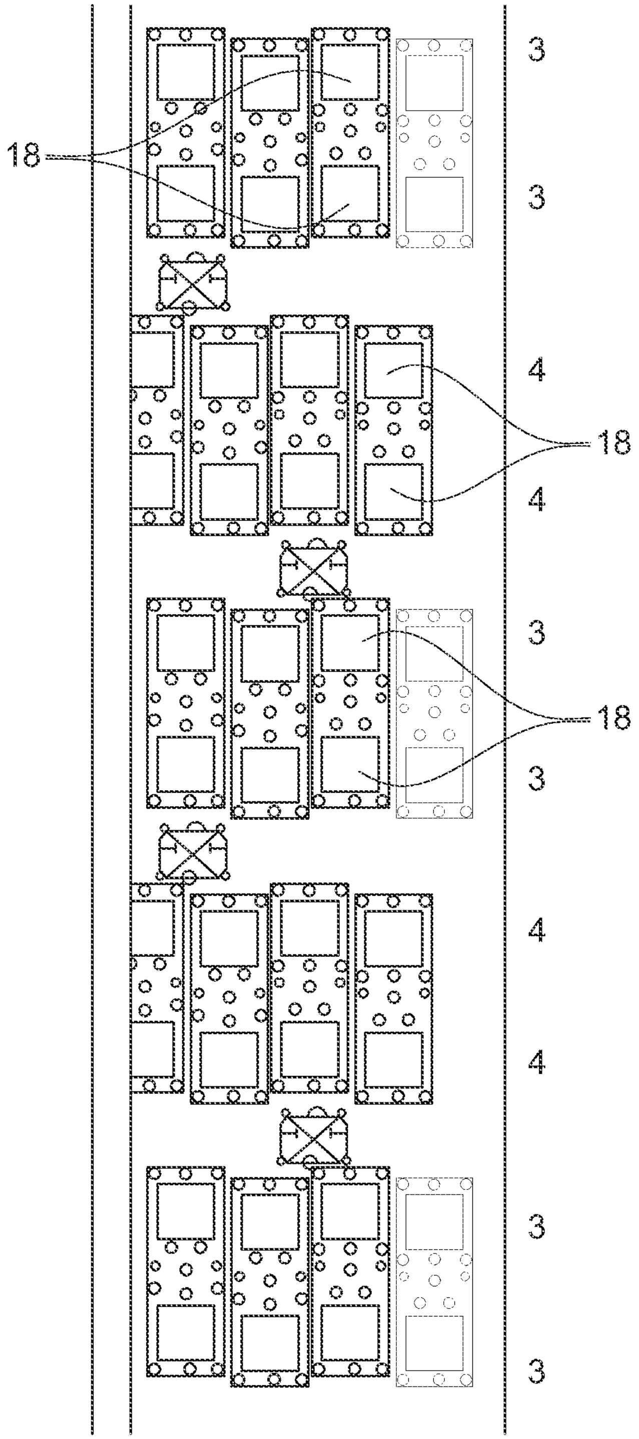
FIG. 7 illustrates an exemplary partial array architecture of from FIG. 3A in accordance with one embodiment.

For these prototypes, one array of elements 58 was made with 3,3, 4,4, 4,4, 4,4, 4,4 pattern (similar to bottom group of FIG. 6 from antenna 50) and another array of elements 18 shown in FIG. 7 with 3,3, 4,4, 3,3, 4,4, 3,3 architecture (i.e. FIG. 7 is similar the top left of antenna 10 of FIG. 3A).

Figure 9A:
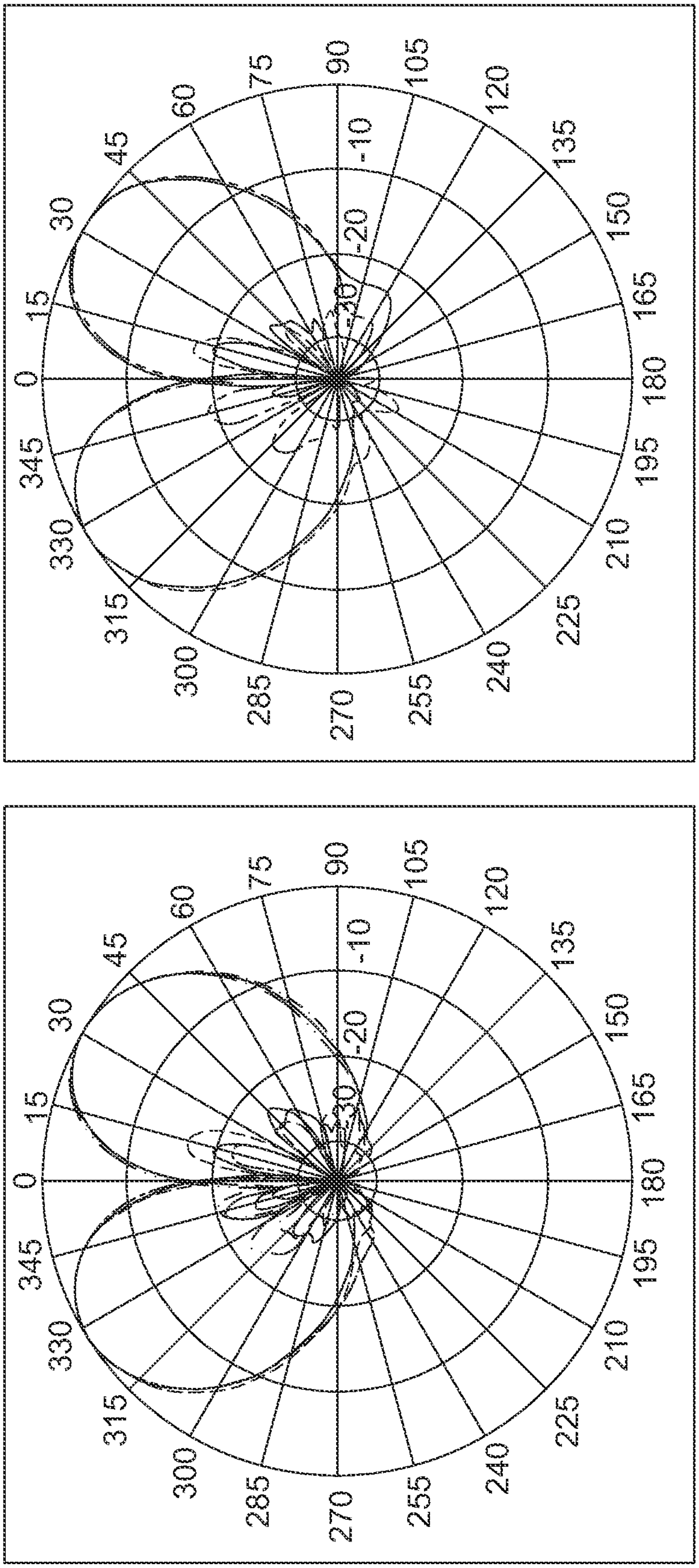
FIGS. 9A and 9B illustrate four coverage patterns comparing azimuth and elevation of exemplary arrays (e.g.
Figure 9A:
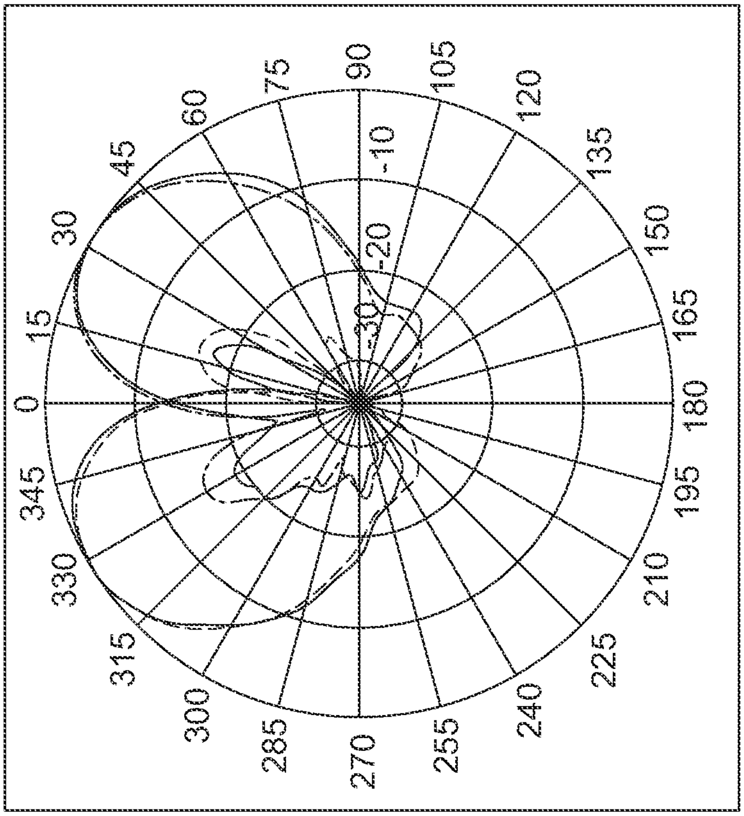
Figure 9A:
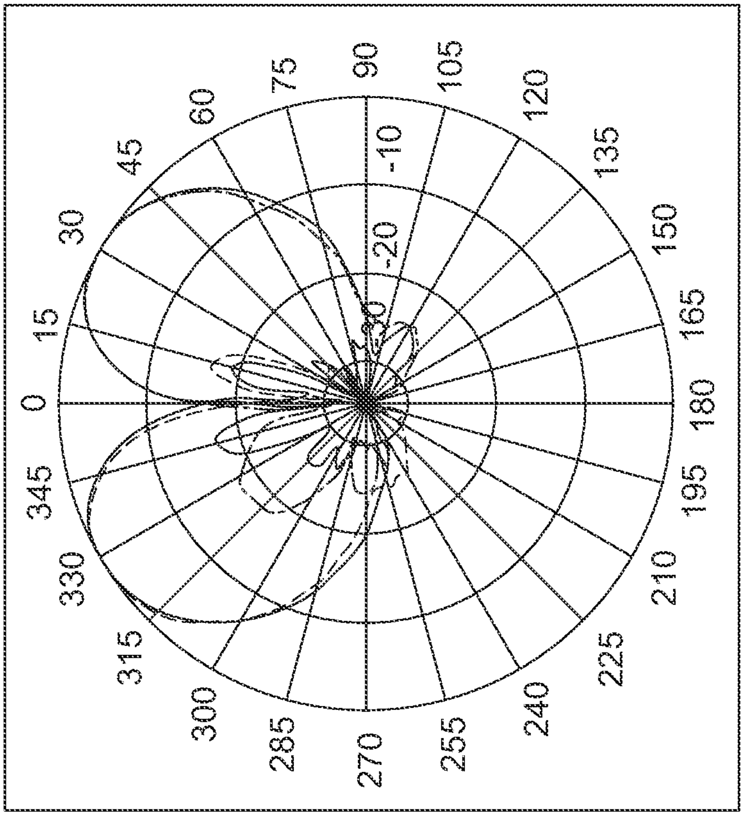
Figure 9B:
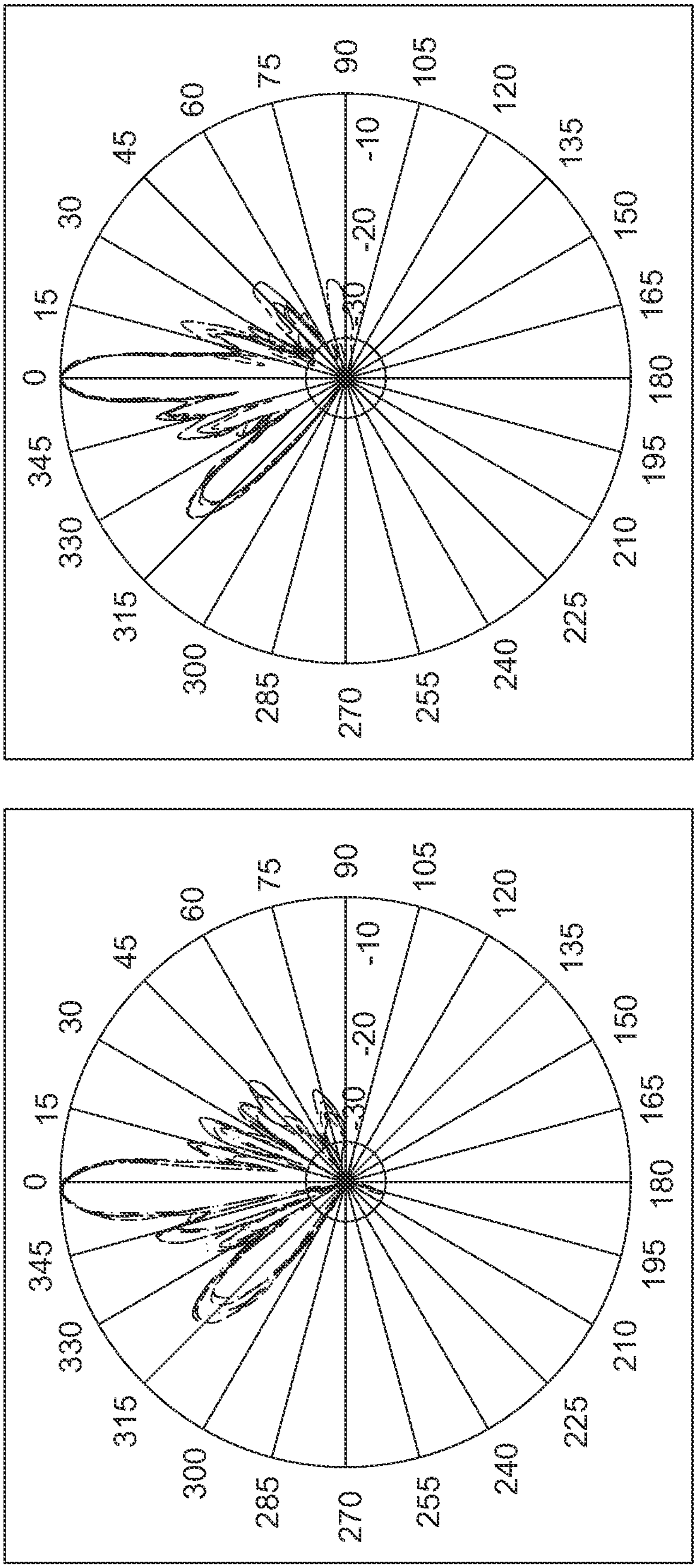
Figure 9B:
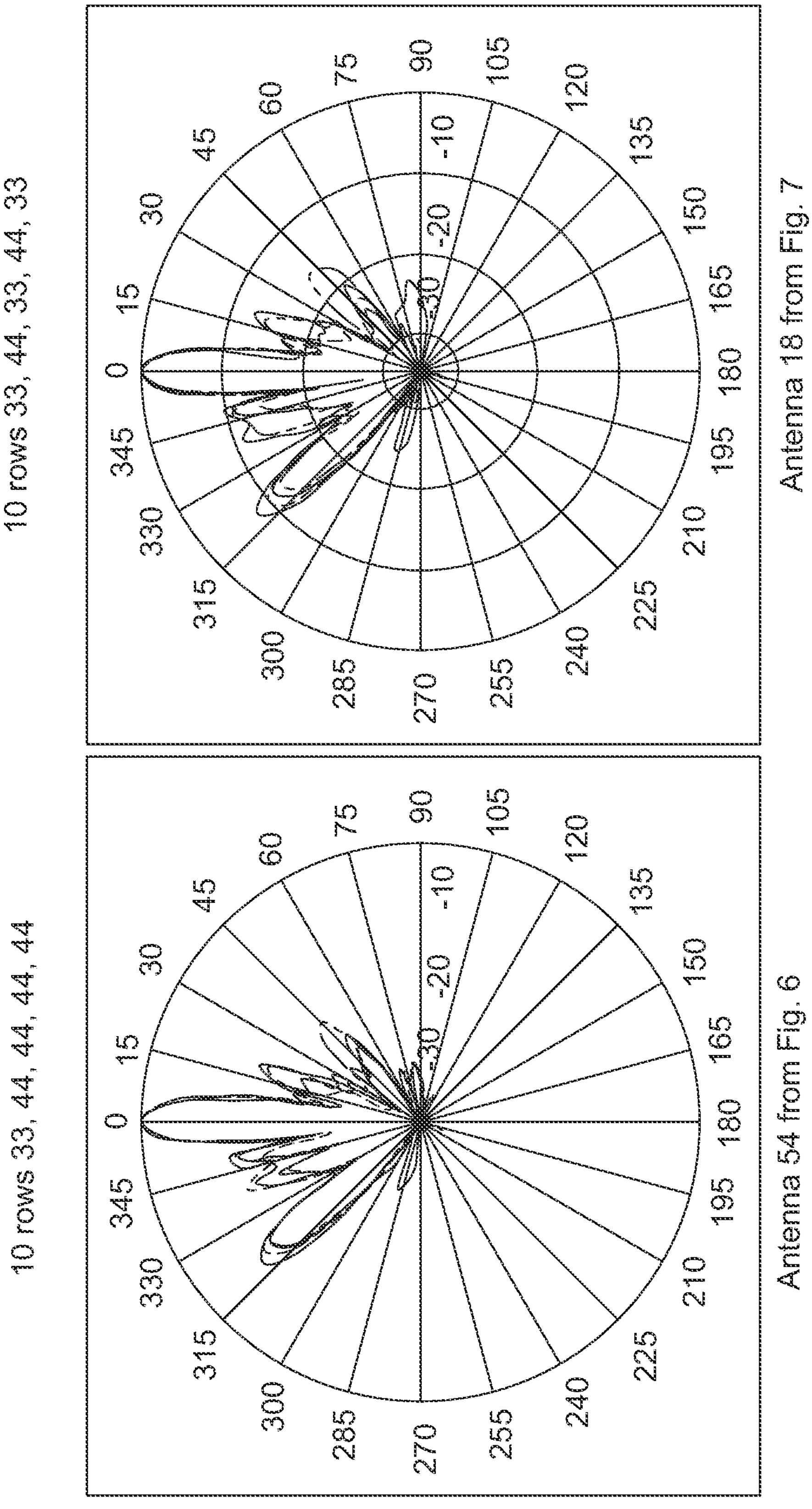

FIGS. 9A and 9B compare the azimuth and elevation patterns of the prior art ten rows 4,4, 4,4, 4,4, 4,4, 4,4 (prior art FIG. 1) and eight rows 4,4, 4,4, 4,4, 4,4 (prior art not shown), architecture, also prior art, compared with the two embodiments of the present invention, with ten rows 3,3, 4,4, 4,4, 4,4, 4,4 pattern (e.g. FIG. 6) and ten rows 3,3, 4,4, 3,3, 4,4, 3,3 (similar to the arrangement shown in FIGS. 7/3A) with the elements being mid-band type patch elements (e.g. 58 or 18) covering 1695-2690 MHz. The azimuth comparisons are shown in FIG. 9A and the elevation patterns comparison are shown in FIG. 9B.

As can be seen in FIGS. 9A and 9B there is only slight changes in the shape of azimuth and elevation pattern which shows that the present seven column antennas 10 in FIGS. 6 and 7 have essentially the same performance and patterns as the prior art eight column antenna of prior art FIG. 1 while being physically around 100 mm narrower. Also, as expected, all of the ten row architecture antennas have narrower elevation beam width compared to eight rows architecture (6.6 deg for ten rows compared to 8.4 deg for eight rows).

Figure 10:
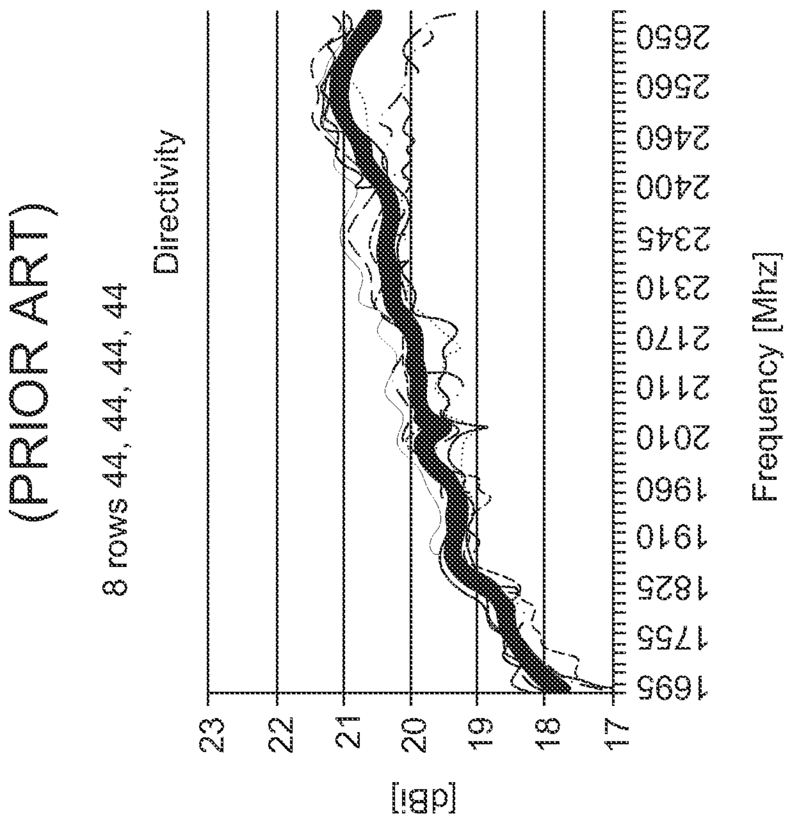
FIG. 10 illustrate graphs comparing the directivity of exemplary arrays compared to the prior art.
Figure 10:
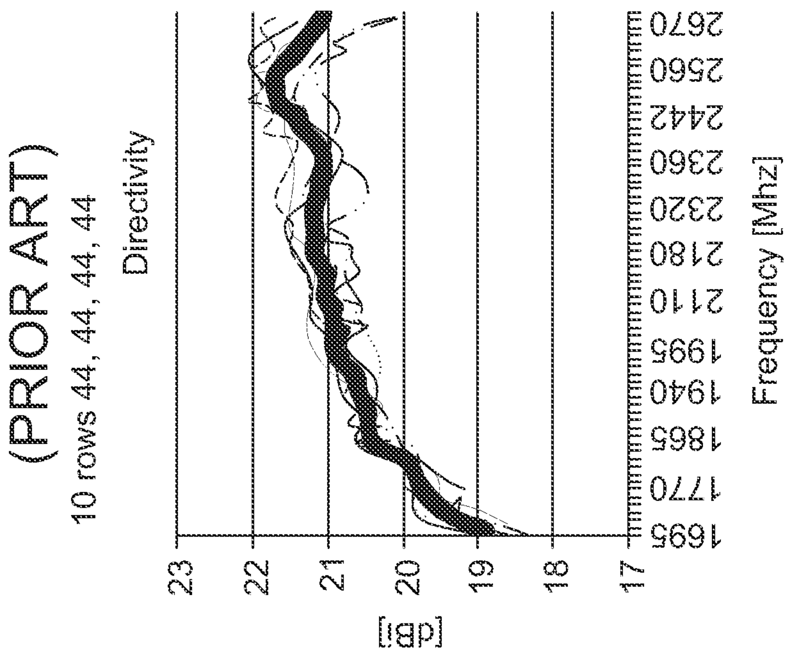
Figure 10:
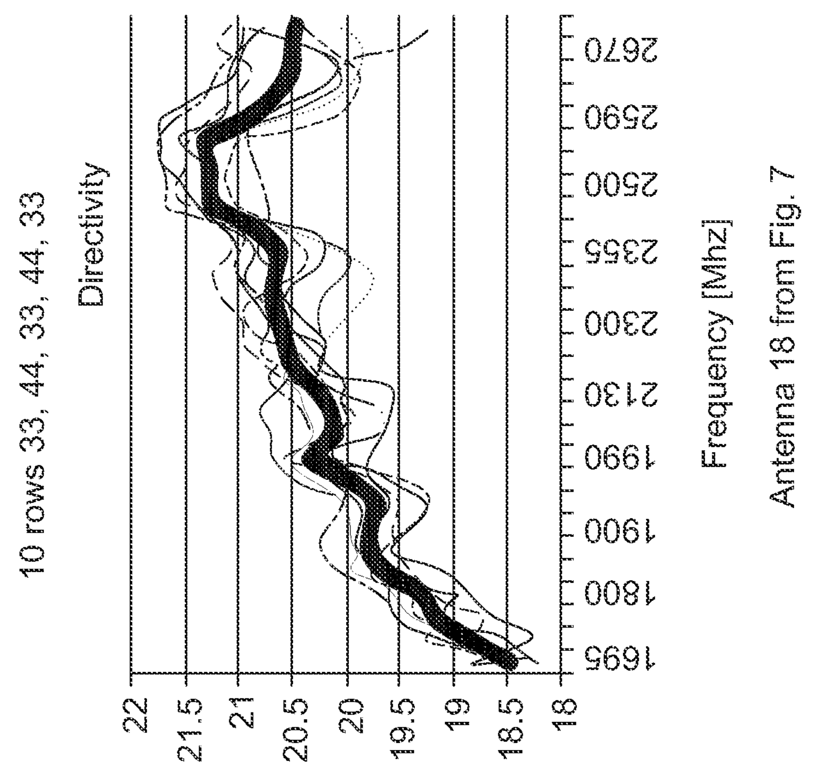
Figure 10:
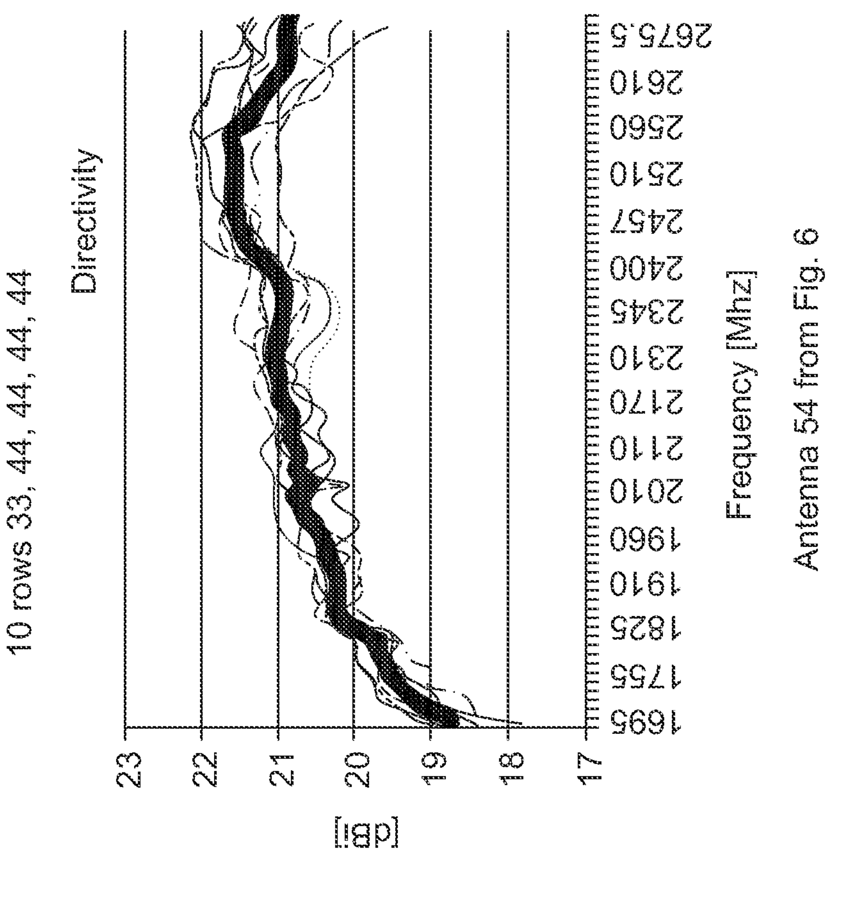

FIG. 10 compares the array directivity (i.e. maximum value of directive gain of antenna solely determined by radiation pattern of antenna and not considering antenna loss) of the above mentioned sample architectures as compared in FIGS. 9A and 9B. As can be seen, the present embodiment of 3,3, 4,4, 4,4, 4,4, 4,4 pattern (e.g. FIG. 6) has almost the same directivity as 4,4, 4,4, 4,4, 4,4, 4,4 pattern of prior art such as the one illustrated in FIG. 1. The full entangled/interweaved present embodiment of 3,3, 4,4, 3,3, 4,4, 3,3 pattern (e.g. FIG. 7) also has good directivity which is 0.5 dB better compared to eight rows 4,4, 4,4, 4,4, 4,4 prior art architecture.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

The invention claimed is:

1. A cellular antenna, having at least one MIMO array, the MIMO array comprising:

at least a first group of elements arranged in a planar arrangement of horizontal rows and vertical columns; and at least a second group of elements arranged in a planar arrangement of horizontal rows and vertical columns, wherein said first group and said second group are arranged at least partially side-by side on said antenna, with said horizontal rows of said elements of said first group being located at a top portion of said antenna and said horizontal rows of said elements of said second group being located at a bottom portion of said antenna, wherein said elements of said first group are arranged in at least one vertical column of elements that is exclusive to elements of said first group, wherein said elements of said second group are arranged in at least one vertical column of elements that is exclusive to elements of said second group, wherein said antenna includes at least one separate common vertical column of elements, that includes elements of both said first group and said second group of elements, wherein at least one row of elements of said first group adjacent a bottom row of said first group comprises fewer elements of said first group than said second group, or wherein at least one row of elements of said second group adjacent a top row of said second group comprises fewer elements of said second group than said first group; and wherein at least one row which includes elements of both said first and second groups does not include an element from either of said first and said second groups in the at least one common vertical column.

2. The cellular antenna as claimed in claim 1, wherein said first and second groups of elements are patch elements.

3. The cellular antenna as claimed in claim 2, wherein said patch elements of said first and second groups are mid-band elements.

4. The cellular antenna as claimed in claim 3, wherein said antenna further comprises one or more dipole antenna elements interspersed in said first and second groups of patch elements.

5. The cellular antenna as claimed in claim 4, wherein said dipole elements are low band elements.

6. The cellular antenna as claimed in claim 1, wherein said first and second groups of elements are dipole elements.

7. The cellular antenna as claimed in claim 1, wherein said antenna includes at least seven vertical columns of elements, where said elements of said first group are arranged in at least three vertical columns of elements that are exclusive to elements of said first group, and wherein said elements of said second group are arranged in at least three vertical columns of elements that are exclusive to elements of said second group.

8. The cellular antenna as claimed in claim 7, wherein said separate at least one common vertical column of elements that includes elements of both said first group and said second group of elements is a seventh column centrally located between said two partially side by side first and second groups.

9. A cellular antenna having at least one MIMO array, the MIMO array comprising:

at least a first group of elements arranged in a planar arrangement of horizontal rows and vertical columns; and at least a second group of elements arranged in a planar arrangement of horizontal rows and vertical columns, wherein said first group and said second group are arranged partially side-by side on said antenna, and with said first group being vertically offset from said second group, wherein said elements of said first group are arranged in at least one vertical column of elements that is exclusive to elements of said first group, wherein said elements of said second group are arranged in at least one vertical column of elements that is exclusive to elements of said second group, wherein said antenna includes at least one separate common vertical column of elements, that includes elements of both said first group and said second group of elements, wherein at least one row of elements of said first group adjacent a bottom row of said first group comprises fewer elements of said first group than said second group, or wherein at least one row of elements of said second group adjacent a top row of said second group comprises fewer elements of said second group than said first group; and wherein at least one row which includes elements of both said first and second groups does not include an element from either of said first and said second groups in the at least one common vertical column.

10. The cellular antenna as claimed in claim 9, wherein said first and second groups of elements are patch elements.

11. The cellular antenna as claimed in claim 9, wherein said patch elements of said first and second groups are mid-band elements.

12. The cellular antenna as claimed in claim 11, wherein said antenna further comprises one or more dipole antenna elements interspersed in said first and second groups of patch elements.

13. The cellular antenna as claimed in claim 12, wherein said dipole elements are low band elements.

14. The cellular antenna as claimed in claim 9, wherein said first and second groups of elements are dipole elements.

15. The cellular antenna as claimed in claim 9, wherein rows of said elements of said first group are located at a top portion of said antenna and rows of said elements of said second group are located at a bottom portion of said antenna.

16. The cellular antenna as claimed in claim 15, wherein at least one vertically central row of elements includes elements from both said first group and said second group.

17. The cellular antenna as claimed in claim 9, wherein said antenna includes at least seven vertical columns of elements, where said elements of said first group are arranged in at least three vertical columns of elements at a top portion of said antenna that are exclusive to elements of said first group, and wherein said elements of said second group are arranged in at least three vertical columns of elements at a bottom of said antenna that are exclusive to elements of said second group.

18. The cellular antenna as claimed in claim 9, wherein said separate at least one common vertical column of elements, that includes elements of both said first group and said second group of elements, is a seventh column centrally located between said two partially side by side and vertically offset first and second groups.

* * * * *